United States Patent Office 3,202,694
Patented Aug. 24, 1965

3,202,694
OXIDATION PROCESS
Isidor Kirshenbaum, Westfield, and Jeffrey H. Bartlett, New Providence, N.J., and Ralph M. Hill, Mayfair, London, England, assignors to Esso Research and Engineering Company, a corporation of Delaware
No Drawing. Filed Mar. 28, 1962, Ser. No. 183,015
4 Claims. (Cl. 260—462)

This application is a continuation-in-part of co-pending application S.N. 860,320, filed December 18, 1959, now abandoned.

This invention relates to a novel technique for selectively increasing the functionality of organic compounds which contain one or more functional groups, especially where these groups are oxygen sensitive.

In particular, this invention relates to a novel process wherein the functionality of a $C_2$ to $C_{30}$ organic compound containing at least one functional group is increased by reacting such compounds with molecular oxygen in the presence of a boric acid compound.

The term "boric acid compound" is used herein to designate boric acid, i.e., $H_3BO_3$, and boron containing compounds which generate boric acid upon contact with water, e.g., boric oxide, i.e., $B_2O_3$; borate esters, e.g. trimethylborate, triethylborate, tributylborate, etc.; alkylboric acids, i.e., $R_2BOH$ (borinic acids) and $RB(OH)_2$ (boronic acids) wherein R is an alkyl radical, preferably a $C_3$-$C_8$ alkyl radical; and the esters of boronic and borinic acids with $C_1$ to $C_4$ alcohols. Of these trimethylborate is preferred. For an explanation of the properties of the aforementioned boric acid compounds see "The Chemistry of Organometallic Compounds," Rochow, Hurd and Lewis, 1957 by John Wiley and Sons, New York and London, pages 127–129.

One object of this invention is to provide a simple technique for introducing oxygen into the molecular structure of an organic compound containing at least one $CH_2$ group and one or more functional groups without substantially affecting the nature or decreasing the numbers of functional groups already existing in such compounds.

In one preferred embodiment of this invention one or more additional hydroxyl groups are introduced into a substituted hydrocarbon which contains one or more existing hydroxyl groups, e.g., alcohols, glycols and phenols. These will be referred to herein as hydroxy hydrocarbons.

In ordinary liquid phase oxidation of organic compounds which contain functional groups such as —OH, many side reactions ordinarily develop creating a smear of various oxidation products. Most often the point of attack of the incoming oxygen is on or near the most sensitive functional groups, resulting in a destruction of the oxygen containing substituent. Thus, for example, primary alcohols are oxidized to corresponding aldehydes and acids while secondary alcohols are oxidized to the corresponding ketones if the original carbon skeleton is to be preserved. More vigorous oxidation of alcohols brings about fragmentation of the original carbon skeleton. However, various other side reactions also occur which reduce the yield of the desired product and complicate separation problems.

It has now been discovered that organic compounds containing hydroxyl groups can be selectively oxidized to introduce additional functional groups without substantially disturbing the basic structure of the feed material by reacting such organic compounds with molecular oxygen in the presence of the aforementioned boron compounds.

The oxygen gas may be introduced in its undiluted form or it may be diluted with an inert gas such as nitrogen. Thus air may serve as the oxidant or a nitrogen-oxygen mixture containing less oxygen than that normally found in air may be employed. Other inert gases may be substituted for the nitrogen. In a preferred embodiment the oxidizing gas will contain 10–20 vol. percent oxygen and correspondingly 90 to 80 vol. percent nitrogen or other inert gases, although in some cases it is possible to oxidize the hydroxy hydrocarbon with oxygen gases containing as low as 3 to 6 vol. percent oxygen.

The amount of boric acid employed in this process may vary somewhat, depending upon the feedstock and the end product desired. In general, the amount of boric acid employed should be in excess of the amount that would be stoichiometrically equivalent to the number of hydroxyl groups to be introduced. Since in the preferred embodiment of this invention it is generally desirable to effect only partial conversion in a single pass operation (although recycle and multi-stage operation are within the scope of the invention) the amount of boric acid added to a reaction mixture in such operation will be generally less than stoichiometric requirements for 100% conversion. Thus the amount of boric acid compound employable may be expressed in other terms. This process requires for the oxidation of a hydroxy hydrocarbon an amount of boric acid compound in excess of that required for complete esterification of the —OH groups in the hydroxy hydrocarbon feed. Preferably the excess amount should be at least 0.02 mole and more preferably 0.05–0.5 mole of boric acid or its equivalent. As will be shown in the operative examples the reaction can be carried out in one stage or more as desired.

In the one stage process the total amount of boric acid, i.e., the amount required to esterify the hydroxyl groups in the feed plus the excess quantity such as specified, is added to the reaction mixture and the oxidation is effected by contact with molecular oxygen at elevated temperatures. It is preferred in this case to mix the alcohol feed with the boric acid compound, heat the mixture to oxidation temperatures and then add the oxygen containing gas. This sequence will effectively tie up all or a substantial number of the hydroxyl groups in the feed material. In the two stage process the hydroxy hydrocarbon feed is first contacted with a boric acid compound to esterify essentially all of the hydroxyl groups. The esterified product is then reacted in a second stage with oxygen at elevated temperatures in the presence of excess boric acid compound. In either case the resultant product will be a borate ester of a di- or polyhydroxy substituted hydrocarbon, i.e., a diborate ester.

When using the other boron compounds disclosed herein, a chemically equivalent amount is used. It should be understood that 1 mole of $H_3BO_3$, a tribasic acid, is considered as constituting three chemical equivalents. The same is true of the borate esters hereinbefore mentioned. Broadly speaking, the present invention gives useful results when employing excess concentrations of $H_3BO_3$ which fall in the range of about 0.02 to 3.0, preferably 0.05 to 0.5 mole of $H_3BO_3$ per mole of organic feedstock exclusive of diluent.

The use of the higher portion of this range is particularly of interest when comparatively large quantities of inert diluent are employed. It is within the scope of this invention to carry out the oxidation reactions of the organic compounds in the presence of an inert diluent or solvent such as benzene, chlorobenzene, dichlorobenzene, bromobenzene, etc. Other inert diluents may be used such as carbon tetrachloride. The presence of a diluent or solvent is especially preferred when oxidizing comparatively low boiling feeds, e.g. propylene and isobutylene. Likewise the temperature and pressure employed with this technique will vary somewhat with the particular reaction contemplated. However, in general, the process may be conducted at temperatures in the range of 100° to 250° C., preferably 140° to 185° C. and pressures ranging from about atmospheric or below to 200 atmospheres or higher, preferably atmospheric to 50 atmospheres.

The oxidation of organic compounds containing functional groups in the presence of boric acid (or other boron compounds hereinbefore disclosed) usually introduces the oxygen into the organic compounds in the form of a borate ester of the alcohol. The increased selectivity to be observed may at first be thought to be introducing an OH group into the organic molecule and then immediately esterifying to avoid further reaction. This simple explanation is not satisfactory from the fact that the use of acetic acid or phosphoric acid in place of boric acid does not result in the selective process described in this invention.

The borate ester of the product alcohol (glycol, etc.) may be converted to the corresponding alcohol (glycol, etc.) by reaction with water or preferably with a lower molecular alcohol, e.g., $C_1$-$C_3$ alcohol, preferably methanol. This ester interchange reaction, especially when using methanol, is a preferred method of recovering the boric acid or derivative thereof from the reaction mixture. When the ester interchange reaction with methanol is used, trimethylborate may be recovered as an azeotrope, boiling point 54.8° C. (769 mm. Hg) and containing 26.1 wt. percent methanol.

The invention may be more easily understood by considering a few of the individual embodiments thereof.

SYNTHESIS OF POLYHYDROXY COMPOUNDS

The need for a simplified process for producing diols, triols and other polyhydroxy compounds has become more acute with the expanded use for such chemicals in the manufacture of plasticizers, agricultural chemicals, polyesters as well as other polymers or resins, medicinals, surfactants, chemical intermediates, etc.

Under prior art processes glycols can be obtained by hydrolysis of the corresponding oxide, hydolysis of chlorohydrins, direct hydroxylation of an olefin with a peroxide and, on a laboratory scale, by reaction of olefins with $KMnO_4$. Each of these processes has specific advantages but also has disadvantages such as expensive starting materials, multi-step operations, complexity of reactions involved, etc.

By the process of this invention glycols may be prepared by the direct oxidation of $C_2$ and higher monohydric alcohols and/or the borate esters thereof. High selectivity to the glycol may be achieved by first esterifying the alcohol such as propanol with boric acid or $B_2O_3$ or by transesterification with methyl borate. Air is passed through the resulting ester mixture in the presence of sufficient additional or excess boric acid or one or more of the previously mentioned boron compounds in an amount at least chemically equivalent to the additional hydroxyl groups to be formed and then reacting the resulting mixture with water or preferably methanol or other suitable alcohol to recover the desired glycols. In the alternative, glycols may also be produced by a simultaneous introduction of both the oxygen and a boric acid compound to the alcohol feedstock The selectivity to glycols is promoted by controlling the rate of oxidation so as not to allow it to exceed the rate of reaction of the boron compounds with the reaction mixture. When preparing a glycol from a monohydric alcohol it is preferred to esterify the alcohol to form the borate ester and then to use about 0.05-0.25 additional mole of $H_3BO_3$ (or equivalent amounts of other boron compounds mentioned herein) in the reaction per mole of alcohol. This corresponds to the use of approximately 0.4-0.6 mole of $H_3BO_3$ per mole of alcohol. Glycols that may be prepared in this manner include propanediol from propanol, butanediol from butanol, hexanediol from hexanol, etc.

Branched chain alcohols and straight chain fatty alcohols such as those containing 8 to 18 carbon atoms are especially useful feedstocks for the manufacture of higher glycols. The conversion of ethanol to ethylene glycol by this process is a particularly valuable embodiment of this invention In conformance with this technique, polyols may also be prepared, e.g., glycerol from propanol and/or the borate ester thereof.

In one embodiment of this invention glycols are prepared by first absorbing an olefin feedstock in sulfuric acid under pressure to form an extract containing an alkyl hydrogen sulfate, hydrolyzing such extract to release the corresponding alcohol, e.g., isopropanol, and subjecting such alcohol to air oxidation in the presence of boric acid in conformance with this invention.

Other polyhydroxyl compounds may be prepared by this general technique employing as the organic feedstock compounds which possess one or more hydroxyl groups in their molecular structure. Thus, xylylene glycol (benzenedicarbinol) may be formed from the corresponding tolylcarbinol (methylbenzyl alcohol) and other aromatic polycarbinols from the corresponding alkyl aromatic alcohols. Similarly alkylated phenols may be converted to phenolic alcohols and glycols.

Although it is often preferred not to use a catalyst, oxidation catalysts which include compounds of cobalt, manganese, and similar metals may be profitably used in certain embodiments. However, such catalysts sometimes tend to reduce the selectivity to hydroxyl containing compounds. An especially effective embodiment of this invention for certain feedstocks is the oxidation in the presence of boric acid and a bromide such as ammonium bromide, HBr, $MnBr_2$, isopropyl bromide, etc. Although less desirable the corresponding chlorides may be used in place of or in conjunction with the bromides. Bromide concentration of 0.1-10 wt. percent (calculated as ammonium bromide and based upon the organic feedstock) may be used, although preferred concentrations when using bromide additions are 0.5-2 wt. percent. Other additives that may be present to advantage during the oxidation in the presence of boric acid include acids such as acetic acid. With some feedstocks there may be advantages of introducing small amounts of oxidation initiators such as peroxides, hydroperoxides, ketones such as methyl ethyl ketone, etc.

Example 1

A $C_{13}$ monohydric branched chain alcohol prepared by the Oxo process is first esterified by mixing 1900 grams of such alcohol with 185.5 grams of $H_3BO_3$ and about 1100 cc. of heptane and heating the resulting mixture for about 5 hours at reflux temperature, i.e., about 95°–98° C. The heptane solvent and excess alcohol are removed by distillation leaving the borate ester as residue. Of this residue 507 grams of ester are charged to a glass reaction vessel. About 26 grams of $H_3BO_3$ are added to the ester. Air is then bubbled through the resulting mixture for 105 minutes. The oxidation is conducted at an average temperature of about 170° C., the actual range being 160°–175° C. at atmospheric pressure. During the reaction water is removed continuously by the exit gas. Total air introduced during oxidation is 20 cu. ft. measured at room temperature, i.e., about 25° C. and at atmospheric pressures. The progress of the reaction is followed by measuring the water removed with the exit gas.

After the oxidation is terminated, the borate ester product is converted to the alcohol by treating the reaction mixture with methanol at reflux temperature, i.e., about 60°–65° C. thereby recovering the $H_3BO_3$ overhead as a lower boiling methyl borate-methanol mixture. The residue is distilled at a pressure of 15 mm. Hg to recover the glycol product, unreacted alcohol and some higher molecular weight product.

Analysis of the aforesaid residue reveals that 15 weight percent of the alcohol has been converted. Of the converted amount the selectively to glycol is 62%.

The same monohydric branched chain alcohol is oxidized under the same conditions as in the run described before but without the employment of $H_3BO_3$. The alcohol is treated with air for 106 minutes at an average temperature of about 170° C., actual range 160°–175° C., at atmospheric pressure. After oxidation is terminated, the product is distilled and analyzed. No glycol is found in spite of the fact that more of the alcohol is oxidized. Among the products found are esters, acids, and carbonyl containing compounds. This demonstrates the marked and surprising effect of $H_3BO_3$ on the selectivity to glycols when oxidizing alcohols.

Example 2

The procedure of the first run of Example 1 is repeated except when an oxygen-nitrogen mixture containing about 5 vol. percent $O_2$ is used in lieu of air. The oxidation time is extended to about 5 hours. A higher selectivity to glycol is found to occur.

Example 3

The procedure of Example 1 is repeated except that the alcohol employed is a $C_{18}$ straight chain, monohydric alcohol. Analysis again reveals glycols in the product.

Example 4

The procedure of Example 3 is repeated except that a nitrogen stream containing about 10–12 vol. percent oxygen is employed as the oxidant. Glycols are recovered as product.

Example 5

A glycol is again prepared in the presence of $H_3BO_3$ as in Example 1 but with the following changes in reactants and procedures. The alcohol feed employed is n-propanol. A charge of 2000 grams of propanol is esterified with 496 grams of $H_3BO_3$. The resulting borate ester is separated from the reaction mixture by distillation and a 750 gram aliquot of the borate ester is transferred to a reaction vessel. About 125 grams of $H_3BO_3$ is added. A diluent, benzene, is also employed. The oxidation is carried out at an average temperature of 165° C. at a pressure of about 10–12 atmospheres using an air-nitrogen mixture containing about 4 vol. percent oxygen. Water is removed during the reaction period and benzene together with unconverted reactants and products carried out by exit gas are recycled to the reaction zone. After 5 hours of reaction time the product is cooled, treated with methanol and the trimethylborate and methanol are removed. Distillation and analysis of the product show the presence of propane diol.

Example 6

The procedure of Example 1 is repeated except that methyl borate is used in place of the $H_3BO_3$ to convert the $C_{12}$ alcohol to the borate ester. A 500 gram charge of this ester is charged to a reactor and 55 grams of methyl borate are added. The oxidation is carried out at an average temperature of about 170° C. and at a pressure of about 15 atmospheres. Product analysis reveals an even higher selectivity to the glycol.

Example 7

The procedure of Example 1 is repeated except that 2-ethyl hexanol is employed as the feedstock. This is first esterified with boric acid. About 800 grams of the resulting $C_8$ borate ester is charged to the reactor with about 25 grams of boric acid and about 0.5 wt. percent ammonium bromide (based on alcohol feed) is added. A nitrogen stream containing about 5 vol. percent oxygen is employed as the oxidant. The selectivity of converted alcohol to glycol is about 65°.

Example 8

260 grams of n-octanol-1 and 52 grams of boric acid are added to a reaction vessel and the mixture heated over a period of one hour to a temperature of 140° C. Dilute air containing 4% oxygen is then bubbled through the reaction product mixture with continued heating over a period of one hour until a temperature of 160°–170° C. is reached. The temperature is maintained at 160°–170° C. for an additional half hour while continually bubbling through 4% dilute air (4% oxygen). The oxygen content is then increased to 20% (straight air) until a 25% conversion is reached. Excess water is then added to the reaction product mixture in order to hydrolyze the resultant borate esters and to liberate free glycol which is recovered via straight fractionation.

Example 9

1,10-decanediol (350 grams) is mixed with 144 grams of boric acid and heated under nitrogen to 150°–160° C. for two hours. The reaction product mixture which will contain the diborate ester of decanediol and excess boric acid is then subjected to straight air oxidation at 150–165° C. until the oxygen uptake indicates a 33% conversion level. The resultant triborate ester is converted to decanetriol in acordance with the hydrolysis procedure recited above.

The term "air oxidation" is used herein to designate an oxidation process wherein the source of oxygen is a gas consisting essentially of a mixture of an inert gas and molecular oxygen.

The term "inert gas" is used herein to designate a gas that does not react with or catalyze reactions between organic compounds and boric acid compounds and is inert to oxidation at the conditions of reaction herein set forth.

All percentages herein shall be construed to mean percentage by weight unless otherwise indicated.

It should be understood that the boric acid compound must be present in a readily reactive form. Thus, it may be present as a substance which is a liquid at the reaction conditions, a finely divided solid, or in solution. Fused boric acid compounds, e.g., fused boric oxide, are not satsfactory.

What is claimed is:

1. A process for preparing a diborate ester which comprises forming a borate ester by reacting a $C_2$ to $C_{30}$ hydroxy substituted hydrocarbon reactant with 0.02 to 3.0 moles, per mole of said hydroxy hydrocarbon reactant, of a boron compound which provides boric acid upon contact with water, said compound being selected from the group consisting of boric acid, boric oxide, lower alkyl borate esters, and alkyl boric acid, and reacting said borate ester of said hydroxy hydrocarbon reactant with a molecular oxygen containing gas at a temperature of 100° to 250° C. in the presence of 0.02 to 3.0 moles, per mole of said borate ester, of said boron compound.

2. A process in accordance with claim 1 wherein said boron compound is boric acid.

3. A process in accordance with claim 1 wherein said boron compound is trimethyl borate.

4. A process for preparing a diborate ester which comprises forming a borate ester by reacting a $C_2$ to $C_{30}$ monohydric alcohol with 0.02 to 0.5 moles, per mole of said alcohol, of a boron compound which provides boric acid upon contact with water, said compound being selected from the group consisting of boric acid, boric oxide, lower alkyl borate esters and alkyl boric acid, and reacting said borate ester of said $C_2$ to $C_{30}$ monohydric alcohol with a molecular oxygen containing gas at a temperature of 100° to 250° C. in the presence of 0.02 to 3.0 moles, per mole of said borate ester, of said boron compound.

References Cited by the Examiner

UNITED STATES PATENTS

| | | | |
|---|---|---|---|
| 1,947,989 | 2/34 | Hellthaler et al. | 260—462 X |
| 2,642,453 | 6/53 | Lippincott | 260—462 |
| 2,741,548 | 4/56 | Darling et al. | 260—462 X |
| 3,061,626 | 10/62 | Pearson et al. | 260—462 |
| 3,076,013 | 1/63 | Liao et al. | 260—462 |

OTHER REFERENCES

Bashkirov, Chem. Abs., vol. 51, p. 4027 (1957).
Scattergood, J. Am. Chem. Soc., vol. 67, pp. 2150 to 2152 (1945).

CHARLES B. PARKER, *Primary Examiner.*

LEON D. ROSDOL, *Examiner.*